3,325,405
POLYMERIC COMPOSITION
Pandurang M. Kamath, Middletown, and Charles E. Frank, Cincinnati, Ohio, assignors to International Copper Research Association, Inc.
No Drawing. Filed July 7, 1965, Ser. No. 470,220
18 Claims. (Cl. 252—12)

This invention relates to a polymeric composition suitable as a self-lubricating bearing material and the method for preparing the same. The invention is based on the discovery that polyethylene, when it is filled with a copper powder having a particle size smaller than about 50 mesh and being treated with a chelating agent capable of forming a copper chelate, exhibits unique properties particularly suitable for use as a self-lubricating bearing material.

The present trend in modern engineering design is to utilize, whenever possible, self-lubricated bearings in place of the conventional external lubricated ones. The changeover is made possible by the recent development of a number of synthetic resins having desirable properties for use as self-lubricating bearing material. Among them, polyethylene, by virtue of its low coefficient of friction, ease of fabrication, availability, and low cost has been seriously considered for such use. However, its low heat distortion temperature, the temperature at which the plastic begins to show appreciable signs of creep or deformation under load, and poor thermoconductivity have severely limited its application. Premature failure of polyethylene bearing generally occurs when the bearing is not capable of dispersing the heat generated by friction at a sufficiently rapid rate which causes overheating of the bearing above the distortion temperature of the polymer.

Many attempts have been made to improve the heat distortion temperature of polyethylene and with most efforts directed to increasing the molecular weight of the polymer. These attempts, however, have met with very little success. The rise of heat distortion temperature by this upgrading method is of a small order and the resultant benefit is overwhelmingly outweighed by the processing difficulties created by the polymer having the increased molecular weight.

The present invention provides a polymeric composition containing polyethylene which has a rare and unique combination of properties and can be prepared at a relatively low cost. This new composition is extremely attractive as a practical engineering material and is particularly advantageous for the production of self-lubricated bearings. Broadly stated, the polymeric composition of this invention comprises a polyethylene resin in which there is dispersed uniformly a copper powder having a particle size smaller than about 50 mesh and a protective chemical capable of forming a chelating compound with the copper. The amount of copper in the resin is about 5% to about 30% by volume of the polymeric composition, and the amount of protective chemical used is about 0.1% to about 2% by weight of the copper.

The copper powder used in the present invention preferably has a particle size in the range from about 200 to about 400 mesh. It may be pure copper powder or a copper alloy containing high copper content such as bronze powder containing about 90% copper and 10% tin. For economical reasons, copper powder of lower quality is preferred. For example, we found commercially available high grade cement copper to be eminently suitable. It is understood that the term "copper powder" used in the specification and the claims includes these different types of copper containing powders.

Typical samples of cement copper from different supply sources have the following sieve analysis:

TABLE 1

|  | Sample 1 | Sample 2 |
| --- | --- | --- |
| Sieve Analysis, Percent: |  |  |
| +100 Mesh | 1.0 | Trace |
| −100+150 | 1.9 | 1.4 |
| −150+200 | 3.5 | 3.1 |
| −200+270 | 3.4 | 3.1 |
| −270+325 | 6.0 | 7.1 |
| −325+400 | ¹2.2 | 85.3 |
| −400 | 82.0 |  |
| Average Particle Size, Microns (Fisher Analyzer): |  |  |
| Entire Sample | 2.30 | 3.70 |
| −325 Mesh | 2.05 | 3.40 |

¹ −325.

The samples indicated above are high grade cement coppers containing above 95% Cu. For example, average assay of Sample 1 showed 98.0% Cu, 0.42% iron, 0.63% insolubles, and 0.42% carbon. Other cement coppers having lower Cu content can also be used.

In preparing the polymeric composition of this invention, the copper powder has a particle size less than about 50 mesh preferably pretreated with a chelating agent capable of forming a copper chelate. The pretreated copper powder is then dispersed into a polyethylene resin together with a small amount of said chelating agent to make up a polymeric composition containing about 5% to 30% by volume of copper. The amount of additional chelating agent added to the resin is about 0.1% to about 2%. In the preferred embodiment of this invention, the amount of copper in the polymeric composition is between about 15% and 25% by volume, and the amount of chelating agent added is in the range from about 0.1% to about 0.5% by weight of the copper.

Chelating agents, that are suitable for the present invention, are characterized by their ability to form a chelate compound with copper. A large number of chelating agents are presently available commercially which are capable of forming copper chelates. Notable among them are the salicylidene amino complex such as N,N'-(disalicylidine)-polyaminoalkanes and N,N'-di(3-allysalicylidene)-diaminoalkane. Other chelating agents include: salicylaldehyde and its derivatives, such as salicylaldehyde imines; aliphatic amines such as ethylenediamine and N,N-dimethylethylenediamine; amino acids such as ethylenediamine tetraacetic acid; and benzotriazole. A number of these chelating agents that have been successfully used in the present invention include:

(a) N,N'-disalicylidine-1,2-propane diamine,
(b) salicylaldoxime,
(c) N-salicylidene-o-aminophenol,
(d) 2,2',4'-trihydroxyazobensene, and
(e) N,N',N'',N'''-tetrasalicylidene tetra-(amino-methyl)-methane.

Almost all types of polyethylene resins can be upgraded by the process of this invention. However, we found that the resultant polymeric composition which possesses the optimum properties for self-lubricated bearing application are derived from linear polyethylene resins of fairly high molecular weight. This type of resin shows reduced viscosities in the range between about 1 and about 5 dl./gm. determined in accordance with ASTM prescribed method D1601–59–T entitled, "Tentative Method of Test for Dilute Solution Viscosity of Ethylene Polymers." The dilute solution viscosity measurements are used as a means to characterize the high polymer molecules within a given series of linkage polymer homologues. The higher the molecular weight the greater the increase in viscosity with a given polymeric concentration.

The bearing prepared from the polymeric composition of this invention has load-velocity capability (PV) higher than about 10,000 at a surface velocity of 1000 f.p.m. The PV limit was determined according to the ASME publication paper No. 61–WA–334 entitled, "Performance of Teflon Fluorocarbon Resins as Bearing Materials." In the test, the unlubricated bearings are prepared by compression molding of the polymeric composition of this invention. The sample cylinder bearing generally 1 in. x 1 in. x 0.060 in. wall is installed in a bearing amount on a test apparatus which has a bearing holder equipped with a torque arm and rotatably mounted on a driven shaft. The shaft can be rotated at surface velocity from 10 to 2000 f.p.m. and the load applied through the bearing to the test bearing can be up to about 3000 lbs. During the tests, the load (p.s.i.), velocity (f.p.m.), friction torque (lb.–ft.), and the temperature (deg. F.) of the bearing holder at 0.125 inch from the rubbing surfaces are continuously monitored. Three surface velocities covering a broad range were selected for the test. At each velocity, the load was added stepwise to the bearing and at each new loading the friction torque and the bearing temperature are allowed to reach equilibrium and maintained at the equilibrium conditions for approximately 30 minutes before additional loads are added. When the increment of the load reaches to a point at which the friction torque and/or temperature can no longer be stabilized, both the torque and the temperature increase rapidly which causes the failure of the bearings. The PV at the highest load plateau at which equilibrium occurs is considered the limiting PV for that particular bearing at the test velocity. The bearing prepared from the polymeric composition of this invention also has a volume loss wear factor K less than tbout $17 \times 10^{-10}$ cu. in.-min./lb.·ft.·hr. in accelerated tests carried out for over 200 hours with little or no indication of failure under the pressure of 40 p.s.i. and surface velocity of 260 f.p.m. The accelerated tests for determining the volume loss wear factor were also conducted in the apparatus for the PV limit test, and the test was carried out in accordance with the ASME publication paper No. 61–WA–334 previously stated. The basic K is developed from wear tests run against a 1-in. cold rolled steel shaft with a 12–16 microinch finish (RMS) and a hardness of 18–22 $R_c$. The test cylindrical bearing was about 1 in. long and approximately 1.060 O.D. There is initially 0.005 in. clearance between the shaft and the bearing inside diameter. For each test bearing, a new shaft which has been initially cleaned with acetone is used. Before the test, the weight of the test bearing is measured on an analytical balance, and the bearing surface is cleaned with acetone. The bearing is then inserted into the bearing holder, and the bearing temperature and friction torque are continuously monitored similiar to the PV test. For the test, 50 hours are used and at the termination of the test period, the sample is removed from the holder and cleaned of wear debris and weighed. The volume wear is calculated from the formula:

$$v = \frac{WL}{d}$$

in which $v$ is the volume wear (cm.$^3$), WL is weight loss (milligrams), and $d$ is density (grams per cm.$^3$). The $v$ is substituted in the following equation:

$$v = KFVT$$

where K is the proportionality factor (volume wear loss factor), F is load (p.s.i.), V is the velocity (f.p.m.), and T is elapsed time (min.). Several tests at various PV levels are generally used. Different PV conditions provide a different K factor for each material For the purpose of comparison, a polyethylene bearing made of the same grade of polyethylene was used in an identical parallel wear test to determine the volume loss wear factor K. The polyethylene bearing failed completely in less than one-half hour due to excess creep and deformation of the sample. Another sample made of nylon, which is probably the most widely used polymer in self-lubricated bearings to date, shows under the identical condition a wear factor K around $1270 \times 10^{-10}$ cu. in.-min./lb.·ft.·hr., approximately 70 times that of the new polymeric composition of this invention, in spite of the fact that the melting point of nylon is about 100° C. above that of polyethylene. Similar tests for the PV limits for nylon bearings show a limit of 5,000, at a surface velocity of 1,000 f.p.m., and the nylon under the test shows the undesirable stick-slip phenomena.

While the exact nature how the various materials combine to provide the unique polymeric composition of this invention is not well understood, the addition of copper to the polyethylene in a manner described in accordance with the present invention contributes at least to mechanical reinforcement, increased thermoconductivity, and prevention of copper catalyzed molecular degradation of the polymer heretofore not obtainable. The total synergistic effect could be the result of an enhanced adhesion between the metal particles and the plastic matrix brought about by the copper treatment.

Although the preliminary upgrading effect on the polyethylene in accordance with the method of this invention is achieved by simple incorporation of copper together with protective agents into polyethylene, the resultant polymeric composition may be upgraded still further by cross linking of the polymeric composition. This secondary upgrading effect is observed on both the high and low molecular weight polyethylene resins. However, the best result is obtained for the low molecular weight resins wherein the primary upgrading effect is less pronounced. Cross linking of polyethylene is well known in the art. The methods which we find eminently suitable are those which use peroxide and high energy gamma radiations to promote the cross-linking.

Further to illustrate this invention, specific examples are described hereinbelow. In all the examples, the compositions were prepared with a Brabender Plastograph which is a shear mixer equipped with roller blades and has a free space of approximately 45 cc. in the mixing chamber. During milling, the chamber was maintained at a fixed temperature by circulating heat transfer oil held at 180° C. or otherwise specified in the example. A nitrogen atmosphere was maintained in the chamber throughout the entire milling operation.

Different types of polyethylene were used in the examples. The description of the polymers, their specifications, and examples in which they were used are listed below:

TABLE 2

| Description of Polyethylene | | | Specifications | | |
|---|---|---|---|---|---|
| Experimental Designation | Reduced Viscosity, dl./gm. | Examples in which it is used | Density, gms./cc. | Highland [1] Melt Index | Common [2] Melt Index |
| XPF 887A | 2.25 | 2 | 0.955 | 8.3 | [3] (0.1) |
| XPF 887B | 3.25 | 1, 10 | 0.955 | 4 | (0.04) |
| XPF 887D | 3.75 | 3 | 0.945 | 1 | (0.01) |
| Marlex 6002 [4] | 1.85 | 4, 5, 6, 7 | 0.960 | (70) | 0.7 |
| TTR 860 | 1.05 | 8, 9 | 0.958 | (>1000) | 16 |

[1] Load on piston = 21,600 gms.
[2] Load on piston = 2,160 gms.
[3] Figures in parenthesis are estimated values.
[4] Phillips Petroleum Company Trademark.

*Example I*

32 grams of XPF 887B high density polyethylene was first charged into the mixing chamber of Brabender Plastograph with rotors revolving at slow speed. After the polymer was thoroughly fused, 0.23 gm. of N,N' disalicylidine 1,2-propanediamine complex was added and after about 5 minutes of additional milling 101 gms. of dry cement copper pretreated with the salicylidine was introduced into the mixing chamber. The pretreated cement copper was prepared by placing 2½ lbs. of cement copper having the particle sizes shown in sample 1 of Table 1 into a stainless steel beaker. The cement copper was covered with 700–800 ml. acetone and agitated thoroughly for about 15 minutes with a power stirrer. After allowing the copper to settle, the bulk of the supernatant liquid is siphoned off. This acetone washing procedure was repeated three times. Subsequent to the third acetone wash, 600 ml. of acetone containing 3 gms. of chelating agent, N,N' disalicylidine 1,2-propanediamine complex, was added to the copper and the contents were stirred for 10 to 15 minutes. The copper was allowed to soak in the salicylidine complex amine solution overnight and, at the end of which time, the damp copper was decanted and transferred into glass trays to provide an increased exposed surface area. The treated copper was then immediately dried in a vacuum oven at 60° to 65° C. under a nitrogen atmosphere and stored under nitrogen in a suitable glass or polyethylene containers for subsequent use.

After the pretreated cement copper was added, the milling operation continued for about 15 minutes to give a thorough uniform composition containing about 25% by volume of copper. The composition was then removed from the mixing chamber and allowed to cool to room temperature in the air. Test specimens were prepared by compression molding of the resultant polymeric composition using specially designated molds and a laboratory Carver Press to provide self-lubricated bearings for tests described previously. The molding temperature and pressure were 160° C. and 4000 p.s.i., respectively.

In the volume loss wear factor test according to the procedure described above, K was found to be $3 \times 10^{-10}$ and $48 \times 10^{-10}$ cu. in.-min./lb.·ft.·hr. at surface velocities of 130 to 260 f.p.m, respectively. The pressure on the specimens in the above tests was 40 p.s.i. The composition also showed PV limits of 17,500 and 10,500 lb. ft./min. at surface velocities of 10 and 1000 f.p.m, respectively, in the procedure described above.

*Example II*

Using the identical milling conditions as in Example I, 33 gms. of XPF 887A high density polyethylene was charged into the mixing chamber. After the polymer was thoroughly fused, 0.23 gm. of N,N' disalicylidine 1,2-propanediamine complex was added, and after 5 minutes of additional milling, 101 gms. of dry cement copper pretreated in a similar manner as described in Example I was introduced and milling continued for about 15 minutes to give a uniform composition containing 25% by volume of copper. The composition was removed from the chamber and compression molded into test specimens. The K was found to equal $6 \times 10^{-10}$ and $$25 \times 10^{-10} \text{ cu. in.-min./lb.·ft.·hr.}$$

at surface velocities of 130 and 260 f.p.m., respectively, and PV limits of 15,000 and 5500 lb. ft./min. at surface velocities of 10 and 1000 f.p.m., respectively. Its heat distortion temperature determined under conditions described under ASTM Test Method D648 was 105° C. In an identical test, pure polyethylene of the same grade showed a heat distortion temperature around 70° C.

*Example III*

Using the same milling condition as described in Example I, 33 gms. of XPF 887D high density polyethylene was charged into the mixing chamber. When the polymer was thoroughly fused, there was introduced 104 gms. of pure copper powder that did not receive any pretreatment with the disalicylidine amine complex. The resultant composition prepared contains again 25% by volume of copper and is devoid of salicylidineamine complex. This composition showed volume loss wear factor K equal to $15,000 \times 10^{-10}$ cu. in.-min./lb.·ft.·hr. at a surface velocity of 130 f.p.m as compared to the $$3 \times 10^{-10} \text{ cu. in.-min./lb.·ft.·hr.}$$

shown under the same conditions by the composition prepared in Example I.

*Example IV*

Employing identical milling conditions as described in Example I, and following an identical procedure, a composition was prepared using Marlex 6002, a high density polyethylene of lower molecular weight than that used in Examples I and II containing once again 25% by volume of copper. The composition when tested for its wear resistance as in Example I showed volume loss wear factor K equal to $38 \times 10^{-10}$ cu. in.-min./lb.·ft.·hr. at a surface velocity of 130 f.p.m.

*Example V*

Employing the same conditions as described in Example I, 33 gms. of Marlex 6002, a high density polyethylene was charged into the mixing chamber. When the polymer was thoroughly fused 0.23 gm. of N,N'-disalicylidine 1,2-propanediamine was added and after another 5 minutes or so of additional milling 101 gms. of dry cement copper pretreated with N,N' disalicylidine 1,2-propanediamine in acetone solution was introduced. With milling continued, the oil bath temperature was slowly lowered until the temperature in the chamber has decreased to 148° C. At this point, 1 gm. of Lupero 130–XL, an organic peroxide supplied by Lucidol Division of Wallace Tiernan Company, was added and blended uniformly into the composition. The polymeric composition containing 25% by volume of copper was removed from the mixing chamber. After the composition was allowed to cool to room temperature, test specimens were prepared by compression molding technique. The specimen molding was carried out in two stages. In the first stage lasting for 15 minutes or so, the mold temperature was held at 145–150° C., and the pressure was moderate, i.e., 500–1000 p.s.i. Under these conditions, the peroxide does not decompose to any appreciable extent. In the second stage, the pressure was increased to 4000 p.s.i. and the mold temperature raised to 178°–180° C. within 5 minutes to bring about cross-linking. This stage was allowed to last for about 20 minutes to insure complete curing. The composition when tested for its wear resistance under the same conditions as in the prior examples showed volume loss wear factor K equal to $11 \times 10^{-10}$ and $32 \times 10^{-10}$ cu. in.-min./lb.·ft.·hr. at a surface velocity of 130 and 260 f.p.m., respectively.

*Example VI*

Employing the same milling conditions as described in Example I, 33 gms. of Marlex 6002, a high density polyethylene was charged into the mixing chamber. When the polymer had thoroughly fused 0.23 gm. of N,N'-disalicylidine 1,2-propanediamine was added, and after 5 minutes or so of additional milling 104 gms. of phosphor bronze powder (90% copper, 10% tin) of a particle size smaller than 325 mesh was introduced and milling continued for about 15 more minutes to obtain a thoroughly uniform composition containing now 25% by volume of phosphor bronze instead of copper. This composition showed volume loss wear factor K equal to $35 \times 10^{-10}$ cu. in.-min./lb. ft. hr. and PV limit of 13,000 and 12,500 lb. ft./min. at surface velocities of 10 and 1000 f.p.m., respectively.

*Example VII*

Employing the same milling conditions as described in Example I, 33 gms. of Marlex 6002, a high density polyethylene was charged into the mixing chamber. When the polymer was thoroughly fused, 0.23 gm. of N,N'-disalicylidine 1,2-propanediamine was added, and after 5 minutes or so of additional milling 31 gms. of Alcoa Atomized Aluminum Powder No. 123 having a particle size 325 mesh was introduced and milling continued for 15 more minutes to obtain a thoroughly uniform composition containing 25% by volume of aluminum instead of copper. It showed volume loss wear factor K equal to $4800 \times 10^{-10}$ cu. in.-min./lb.·ft.·hr. at a surface velocity of 130 f.p.m. as compared to values in the range $3 \times 10^{-10} - 38 \times 10^{-10}$ cu. in.-min./lb.·ft.·hr. shown by various comparable compositions based on copper.

*Example VIII*

Employing the same conditions as described in Example I, 35.3 gms. of TTR 860, a high density polyethylene considerably lower molecular weight than that used in Examples I–VII, was charged into the mixing chamber. When the polymer was thoroughly fused 0.23 gm. of N,N'-disalicylidine 1,2-propanediamine was added and after another 5 minutes or so the additional milling 82.6 gms. of dry cement copper pretreated with N,N'-disalicylidine 1,2-propanediamine in acetone solution was introduced to give a composition containing 20% by volume of copper. This composition when tested for its wear resistance in the usual manner at 40 p.s.i. pressure showed volume loss wear factor K equal to $2800 \times 10^{-10}$ cu. in.-min./lb.·ft.·hr. at a surface velocity of 130 f.p.m.

*Example IX*

Several test specimens made as in Example VIII were arradiated with $Co^{60}$ gamma radiation to dosage of 30 megarads to cross-link the composition. The cross-linked composition showed volume loss wear factor equal to $24 \times 10^{-10}$ cu. in.-min. lb.·ft.·hr. as compared with $K = 2800 \times 10^{-10}$ cu. in.-min./lb.·ft.·hr. shown by the uncross-linked composition in Example VIII under identical testing conditions.

*Example X*

Pure high density polyethylene XPF 887B was molded into several wear-test specimens and its wear resistance determined as in Example I above. The unfortified pure polyethylene failed disastrously in less than ½ hour due to excessive creep and deformation at surface velocities less than 230 f.p.m., and no wear factor could therefore be measured.

We claim:
1. A polymeric composition comprising a polyethylene resin in which there is dispersed uniformly a copper powder having a particle size smaller than about 50 mesh and a protective chemical capable of forming a chelating compound with the copper, the amount of copper in said resin being about 5% to about 30% by volume of said composition and the amount of protective chemical used being about 0.1% to 2% by weight of the copper.

2. A polymeric composition comprising a polyethylene resin in which there is dispersed uniformly a copper powder having a particle size in the range from about 200 to about 400 mesh and a protective chemical capable of forming a chelating compound with the copper, the amount of copper in said resin being about 15% to about 25% by volume of said composition and the amount of protective chemical used being about 0.1% to 0.5% by weight of the copper.

3. A polymeric composition comprising a high density polyethylene resin in which there is dispersed uniformly a copper powder having a particle size in the range from about 200 to about 400 mesh and a protective chemical capable of forming a chelating compound with the copper, the amount of copper in said resin being about 15% to about 25% by volume of said composition and the amount of protective chemical used being about 0.1% to 0.5% by weight of the copper and said polyethylene resin having a reduced viscosity in the range between about 1 and about 5 dl./gm.

4. A polymeric composition comprising a high density, linear polyethylene resin in which there is dispersed uniformly a copper powder having a particle size in the range between about 200 to about 400 mesh and a protective chemical capable of forming a chelating compound with the copper selected from the group consisting of (a) N,N'-disalicylidine-1,2-propane diamine, (b) salicylaldoxime, (c) N-salicylidene-o-aminophenol, (d) 2,2',4'-trihydroxyazobenzene, and (e) N,N',N'',N'''-tetrasalicylidene tetra-(aminomethyl)-methane, the amount of copper in said resin being about 15% to about 25% by volume of said composition and the amount of protective chemical used being about 0.1% to 0.5% by weight of the copper and said polyethylene resin having a reduced viscosity in the range between about 1 and about 5 dl./gm.

5. A polymeric composition suitable as a self-lubricating bearing material comprising (I) a polyethylene resin, and (II) a copper powder uniformly dispersed in said resin, said copper powder having a particle size smaller than about 50 mesh and being treated with a protective chemical capable of forming a chelating compound with said copper powder, the amount of copper in said resin being about 5% to about 30% by volume of said composition.

6. A polymeric composition suitable as a self-lubricating bearing material comprising (I) a high density linear polyethylene resin, and (II) a copper powder dispersed uniformly in said resin, said copper powder having a particle size in the range between about 200 mesh and about 400 mesh and being treated with a chelating agent forming a protective copper chelate on the surface of said copper powder, the amount of copper in said resin being about 15% to about 25% by volume of said composition.

7. A molded self-lubricating polymeric bearing comprising (I) a high density linear polyethylene resin, and (II) a copper powder dispersed uniformly in said resin, said copper powder having a particle size in the range between about 200 mesh and 400 mesh and being treated with a chelating agent to form a protective copper chelate on the surface of said copper powder, the amount of copper in said resin being about 15% to about 25% by volume of said bearing and said bearing having a volume loss wear factor less than about $17 \times 10^{-10}$ cubic inch-minute per pound-foot-hour and a PV capability higher than about 10,000 pound-foot per minute at surface velocity of 1000 f.p.m.

8. A molded self-lubricated polymeric bearing comprising (I) a high density linear polyethylene resin, and (II) a copper powder dispersed uniformly in said resin, said copper powder having a particle size in the range between about 200 mesh and 400 mesh and having on its surface a protective copper chelate, the amount of copper in said resin being about 15% to about 25% by volume of said bearing, said chelate being the reaction product of said copper powder and a chelating agent selected from the group consisting of (a) N,N'-disalicylidine-1,2-propane diamine, (b) salicylaldoxime, (c) N-salicylidene-o-aminophenol, (d) 2,2'4'-trihydroxyazobenzene, and (e) N,N',N'',N'''-tetrasalicylidene tetra-(aminomethyl)-methane, and said bearing having a volume loss wear factor less than about $17 \times 10^{-10}$ cubic inch-minute per pound-foot hour and a PV capability higher than about 10,000 pound-foot per minute at surface velocity of 1000 f.p.m.

9. A method for preparing a polymeric composition suitable as a self-lubricated bearing material comprising the steps of treating a copper powder having a particle size less than about 50 mesh with a chelating agent capable of forming a copper chelate and dispersing the resultant copper powder in a polyethylene resin together with a small amount of said chelating agent, the amount of copper powder in said resin being about 5% to about 30% by volume of said composition and the chelating agent added to said resin being about 0.1% to about 2% by weight of said copper.

10. A method for preparing a polymeric composition suitable as a self-lubricating bearing material comprising the steps of treating a copper powder having a particle size in the range between about 200 mesh and about 400 mesh with a chelating agent capable of forming a copper chelate and dispersing the resultant copper powder in a polyethylene resin together with a small amount of said chelating agent, the amount of copper powder in said resin being about 15% to about 25% by volume of said composition and the chelating agent added to said resin being about 0.1% to about 2% by weight of said copper.

11. Method according to claim 10 in which said chelating agent is selected from the group consisting of (a) N,N'-disalicylidine-1,2-propane diamine, (b) salicylaldoxime, (c) N-salicylidene-o-aminophenol, (d) 2,2',4'-trihydroxyazobenzene, and (e) N,N',N'',N'''-tetrasalicylidene tetra-(aminomethyl)-methane.

12. A method for preparing a self-lubricated polymeric bearing comprising the steps of treating a copper powder having a particle size in the range between about 200 and about 400 mesh with a chelating agent capable of forming a copper chelate, dispersing the resultant copper powder with a small amount of said chelating agent in a high density polyethylene resin having a reduced viscosity in the range between about 1 and 5 dl./gm., the amount of the copper powder in said resin being about 15% to about 25% by volume of said bearing and the amount of chelating agent added being about 0.1% to 0.5% by weight of said copper powder, and molding the resultant mixture in a predetermined shape of a bearing, said bearing having a volume loss wear factor less than about $17 \times 10^{-10}$ cubic inch-minutes per pound-foot-hour and a PV capability higher than about 10,000 pound-foot per minute at a surface velocity of 1000 f.p.m.

13. A method according to claim 12 wherein said chelating agent is selected from the group consisting of (a) N,N'-disalicylidine-1,2-propane diamine, (b) salicylaldoxime, (c) N-salicylidene-o-aminophenol, (d) 2,2',4'-trihydroxyazobenzene, and (e) N,N',N'',N'''-tetrasalicylidene tetra-(aminomethyl)-methane.

14. A method for preparing a polymeric composition comprising the steps of treating a copper powder having a particle size in the range between about 200 and about 400 mesh with a chelating agent capable of forming a copper chelate, dispersing the resultant copper powder with a small amount of chelating agent in a high density polyethylene resin having a reduced viscosity in the range between about 1 and 5 dl./gm., the amount of the copper powder in said resin being about 15% to about 25% by volume of said bearing, and the amount of chelating agent added being about 0.1% to 0.5% by weight of said copper powder, and cross-linking the resulting mixture.

15. A method according to claim 14 wherein the cross-linking step is initiated by an organic peroxide.

16. A method according to claim 14 in which the cross-linking step is initiated by gamma radiation.

17. A method for preparing a self-lubricated polymeric bearing comprising the steps of treating a copper powder having a particle size in the range between about 200 and about 400 mesh with a chelating agent capable of forming a copper chelate, dispersing the resultant copper powder with a small amount of said chelating agent in a high density polyethylene resin having a reduced viscosity in the range between about 1 and 5 dl./gm., the amount of the copper powder in said resin being about 15% to about 25% by volume of said bearing and the amount of chelating agent added being about 0.1% to 0.5% by weight of said copper powder, and simultaneously moulding and cross-linking the resulting mixture into a predetermined bearing shape, said bearing having a volume loss wear factor less than about $17 \times 10^{-10}$ cubic inch-minute per pound-foot-hour and a PV capability higher than about 10,000 pound-foot per minute at a surface velocity of 1000 f.p.m.

18. A method according to claim 17 wherein the simultaneous cross-linking and molding are preformed in a two-step operation and said cross-linking being initiated by an organic peroxide.

No references cited.

MORRIS LIEBMAN, *Primary Examiner.*

S. L. FOX, *Assistant Examiner.*